United States Patent
Kelly et al.

(10) Patent No.: US 8,442,058 B2
(45) Date of Patent: *May 14, 2013

(54) LOCATING STATIONS BETWEEN PROTOCOLS

(75) Inventors: Michael R. Kelly, Omaha, NE (US); Bradley T. Kenyon, Omaha, NE (US); Mark A. Gullett, Monument, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2658 days.

This patent is subject to a terminal disclaimer.

(21) Appl. No.: 10/426,350

(22) Filed: Apr. 30, 2003

(65) Prior Publication Data

US 2004/0218572 A1 Nov. 4, 2004

(51) Int. Cl.
 H04L 12/28 (2006.01)
 H04J 3/17 (2006.01)
 H04J 3/16 (2006.01)
 H04J 3/22 (2006.01)

(52) U.S. Cl.
 USPC ........ 370/395.5; 370/433; 370/466; 370/467; 370/469

(58) Field of Classification Search .................. 370/338, 370/331; 455/406
 See application file for complete search history.

(56) References Cited

U.S. PATENT DOCUMENTS

| | | | |
|---|---|---|---|
| 5,933,784 A * | 8/1999 | Gallagher et al. | 455/552.1 |
| 6,526,033 B1 | 2/2003 | Wang et al. | |
| 6,915,116 B2 * | 7/2005 | Wang et al. | 455/101 |
| 2002/0169883 A1 * | 11/2002 | Bright et al. | 709/230 |
| 2004/0151162 A1 * | 8/2004 | Ramaswamy | 370/352 |

OTHER PUBLICATIONS

C.-K.Toh, "Maximum battery life routing to support ubiquitous mobile computing in wireless ad hoc networks," Communications Magazine,IEEE., vol. 39, issue 6, Jun. 2001 pp. 138-147.*

3GPP2, "Network Interworking between GSM MAP and ANSI-41 MAP—Revision B",Revision 0, 3GPP2 N.S0028,Version 1.0.0, Apr. 2002.*

Buechner, Maryanne M. "Making the Call." TIME magazine. Jun. 5, 2000. Apr. 4, 2007 <http://www.time.com/time/magazine/article/0,9171,46545,00.html?iid=chix-sphere>.*

* cited by examiner

Primary Examiner — Ayaz Sheikh
Assistant Examiner — Sori Aga

(57) ABSTRACT

A wireless system including a first network protocol, a second network protocol, and an interoperability node. The interoperability node operable on the system to locate one or more stations within one or more of the first and second network protocols.

19 Claims, 5 Drawing Sheets

LOCATING STATIONS BETWEEN PROTOCOLS

Traditionally, wireless devices could only access a network by utilizing either a voice or data connection. Currently, in the wireless industry, devices have been created that can utilize voice and/or data connections. This versatility is limited by several structural limitations within the networks to which these devices connect. For example, when a session is to be initiated by a device, the device is typically programmed to understand a single network protocol and therefore it cannot readily communicate with other networks. Additionally, some networks do not service the entire area in which a device may be utilized and therefore, there are times when the device is inaccessible on a particular network.

With each advance of a new protocol into the industry or the advance of an existing protocol into a new coverage area, the infrastructure providing communication between devices must be changed to accommodate the new or newly available protocol. In order to change the infrastructure without requiring all of their subscribers to purchase devices compatible with a protocol not currently available in their area, many providers are trying to update their existing infrastructure to support both existing protocol and the newly available protocol, at least temporarily. Another approach has been to overlap a new protocol infrastructure over an area covered by an existing protocol. In this way, both, the users of the existing protocol and the users of the newly available protocol, can utilize their devices in the same or similar coverage areas.

Based upon this approach, currently, several networks supporting voice, data, and/or video oftentimes overlap each other, at least partially. In this situation it could be possible for the device to switch from communicating with a first network to a second network. For example, it may be less expensive for a user to communicate on one network versus the other, so it would be desirable to switch to the least expensive network, when possible.

However, when two different types of networks are connected and need to communicate information from one to another, a translator must be provided to interpret the information from one set of network protocols to another. Currently, each time a new network is connected to the system, a new translator, or gateway, needs to be installed to do the translating from each of the existing networks connected to the system to and from the new network.

For example, when a global system for mobile communications (GSM) network is connected to another network (such as an ANSI network), the two networks need to be connected with a translator between them. When a data network (such as the Internet) is connected to the GSM-ANSI system, a translator needs to be interposed between the GSM and the data networks as well as another translator between the ANSI and the data networks. This GSM-ANSI-data system then has three networks and three translators translating between them.

The use of three separate translators necessitates additional equipment costs and involves the multiple entry of subscriber information. Further, there is an increase in the number of network based messages passing between the different components of the networks.

DETAILED DESCRIPTION

Embodiments of the present invention provide cross protocol interoperability for locating a station registered on a network regardless of the protocol of the requesting station or network. In this way a communication session can be created between the requesting station or network and any of a number of networks upon which the station is registered.

Embodiments can be performed by software, application modules, and computer executable instructions operable on the systems and devices shown herein or otherwise. The invention, however, is not limited to any particular operating environment or to software written in a particular programming language. Software, application modules and/or computer executable instructions, suitable for carrying out embodiments of the present invention, can be resident in one or more devices or locations or in several and even many locations.

Unless explicitly stated, the method embodiments described herein are not constrained to a particular order or sequence. Additionally, some of the described method embodiments or elements thereof can occur or be performed at the same point in time.

As one of ordinary skill in the art will appreciate upon reading this disclosure, a network infrastructure can support a communications session. Communications sessions include, for example, data transfer, voice transfer, video transfer, and a mix of data, voice, and/or video, to name a few.

The infrastructure is operable to initiate a communications session from one station (requesting station) to another station (target station). A station can be any interface equipment used to receive and transmit information to and/or from a user. Examples of stations include mobile devices, handsets, or computer terminals, among others.

Communications sessions can be initiated from stations that are operable on one or more of a variety of serving networks including, but not limited to Publicly Switched Telephone Networks (PSTN), global system for mobile communications (GSM) networks, American National Standards Institute (ANSI) networks, Public Wireless Local Area Networks (PWLAN), and/or Internet Protocol (IP) networks, to name a few.

Figure 1:
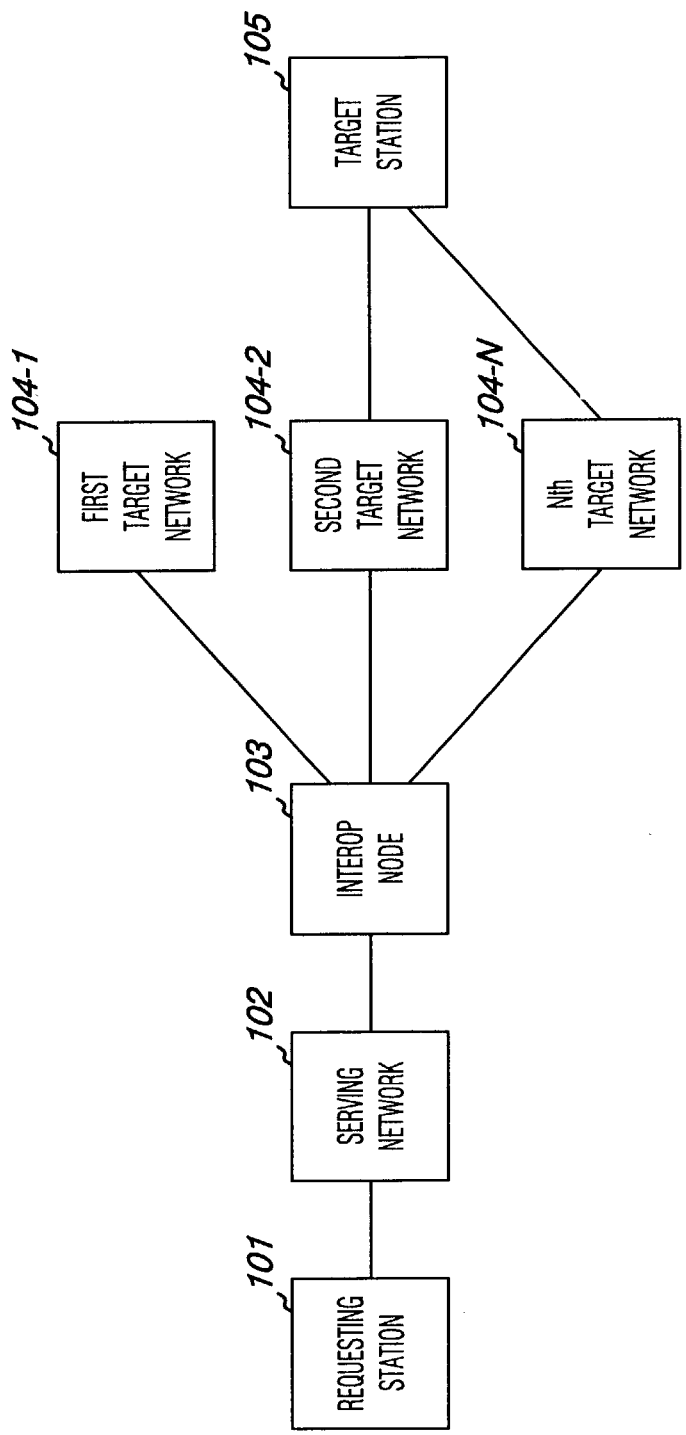
FIG. 1 is a block diagram of a system embodiment illustrating a connection between a requesting station and a target station.

FIG. 1 is a block diagram of an interoperability connection according to a system embodiment. In this embodiment, a requesting station 101 is attempting to locate a target station 105 to initiate a communications session. The requesting station 101 is communicating through a serving network 102 and is utilizing an interoperability node 103. The network 102 can be any network known in the art. Additionally, the serving network 102 can also be a network protocol operable to allow the station 101 to communicate with one or more particular networks. If the target station 105 is located and registered on the serving network 102, then the serving network 102 can connect the requesting station 101 and the target station 105 to start a communications session directly, without utilizing the interoperability node 103.

However, if the target station 105 is not located and/or registered on the serving network 102, then in order to connect the requesting station 101 with the target station 105, the serving network 102 must look to another network in which to establish the communication session. To accomplish this, the serving network 102 accesses an interoperability node 103 that is operable to communicate with a number of different networks. In various embodiments, the interoperability node 103 can be located within the serving network 102 or at an external location, such as within another network, e.g. networks 104-1 to 104-N, or can be independent of any network.

The interoperability node 103 can contact one or more networks, such as 104-1 to 104-N, to determine whether a target station 105 is located thereon. The networks return either a confirmation that the target station 105 has a location identifier associated with the network or reply that the target station 105 is not located on the network. For example, the interoperability node 103 contacts the first target network 104-1 to ascertain whether the target station 105 has a location identifier associated with the network 104-1. In the embodiment of FIG. 1, the target station 105 has been assigned a location identifier on target networks 104-2 and 104-N and therefore, target network 104-1 responds that the target station 105 in not located on the first target network 104-1. Target networks 104-2 and 104-N confirm the location of the target station 105 on their networks.

The interoperability node is operable to check each target network 104-1 to 104-N and can do so, for example, serially, by contacting each target network individually and waiting for an answer before contacting the next network. The interoperability node can also check each target network serially, for example, without waiting to hear an answer before contacting the next station. In various embodiments, the interoperability node can also check the target networks in parallel, by sending a message to several networks simultaneously. However, the invention is not so limited and contact can be accomplished in any number of manners.

Figure 2A:
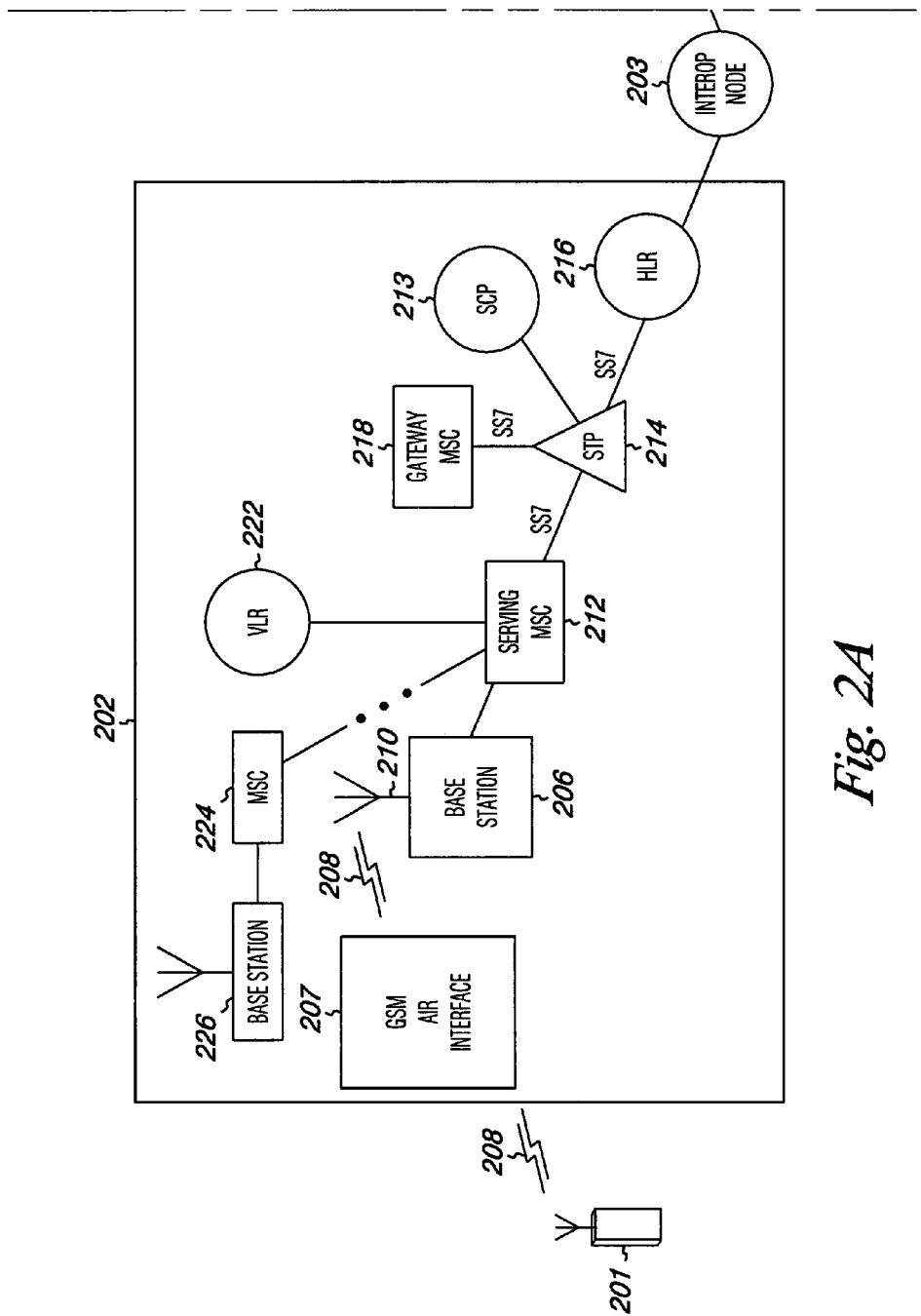
FIG. 2A is a block diagram illustrating an embodiment of a GSM network.
Figure 2B:
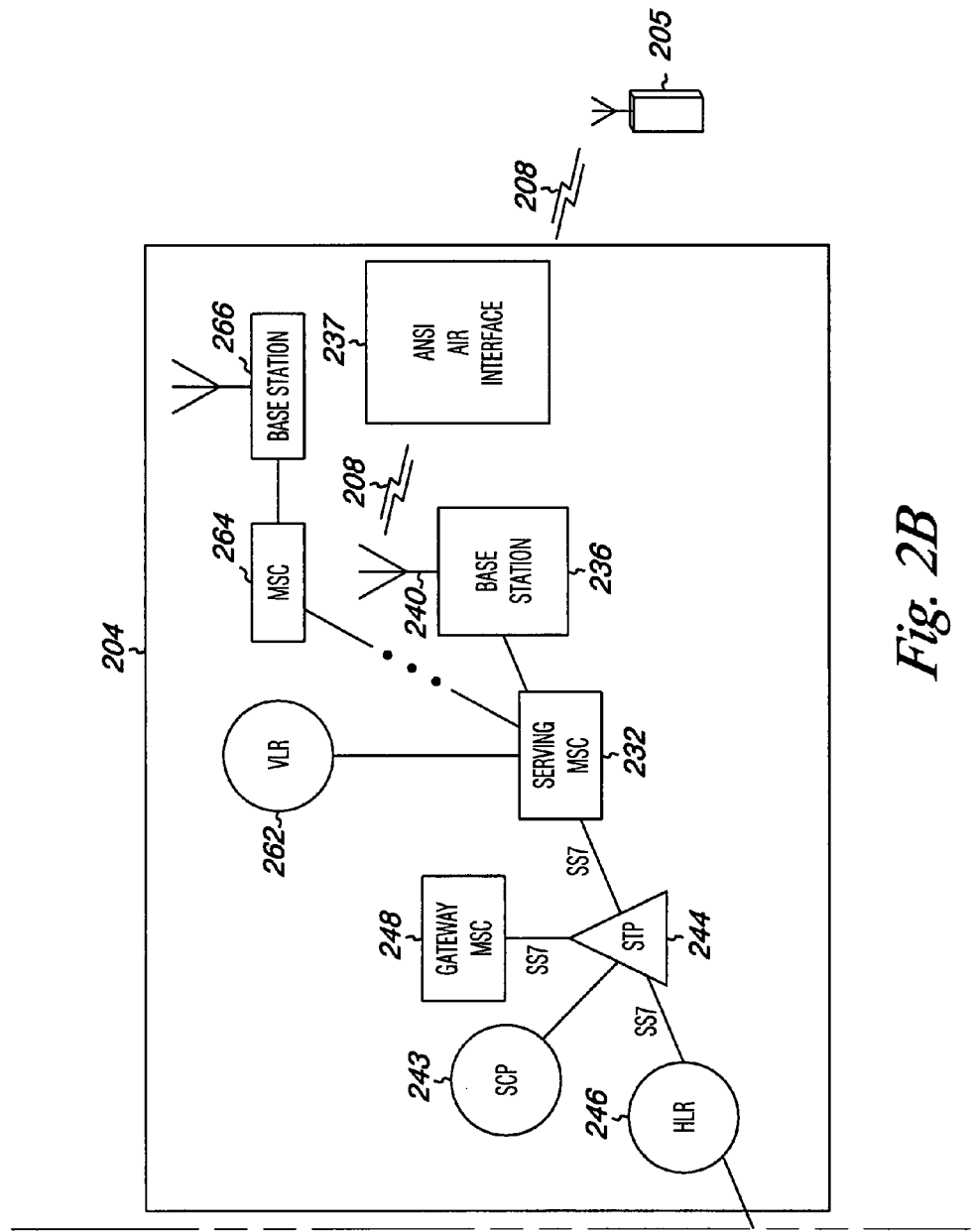
FIG. 2B is a block diagram illustrating an embodiment of an ANSI network.

FIGS. 2A and 2B illustrate an embodiment of a connection between a requesting station 201 and a target station 205. FIGS. 2A and 2B generally illustrate a block diagram of an embodiment having requesting station 201, communicating through a GSM network infrastructure 202, with a target station 205, utilizing an ANSI network infrastructure 204, through an interoperability node 203.

The stations that can be utilized can be fixed or mobile devices and can have several networks upon which a communications session can take place. In FIGS. 2A and 2B, the networks shown are operable to be utilized as mobile networks and the structures of embodiments of these networks are described in detail below. However, the invention is not limited to the structures shown.

In FIG. 2A, a GSM network 202 includes a requesting station 201 communicating with a mobile switching center (MSC) 212 through a GSM air interface 207 with a base station 206 having an antenna 210. The heart of wireless telecommunications networks, such as the examples shown in FIGS. 2A and 2B, is the MSC that is connected to a plurality of base stations that are dispersed throughout the geographic area serviced by the network.

The geographic area serviced by a wireless telecommunications network is partitioned into a number of spatially distinct areas called "cells." Each MSC is responsible for, among other things, establishing and maintaining calls between stations, such as between a mobile device and a wireline terminal, which is connected to the system via local and/or long-distance networks. An MSC is a telephone switch specialized for wireless and mobility support. An MSC performs various functions, including mobility management, call handoffs, call admission, call control, resource allocation, and so forth. The call is then relayed from the MSC to base stations and via wireless communications to the station.

In FIG. 2A, whenever a station, e.g. 201, activates or roams into a new MSC coverage area (i.e., the "cell" for which the MSC is responsible), the new MSC becomes the serving MSC 212. The station 201 transmits its stored identity to the new serving MSC via a base station 206. As shown in FIG. 2A, the subscriber identity information is transmitted over a radio channel 208 in a format compliant with an air interface standard and detected by an antenna 210 of base station 206.

Base station 206, in turn, transmits the subscriber identity information to the serving MSC 212, such as for example via communication line 212. The procedures and protocol for communication between the base station 206 and the MSC 212 have also been standardized. For an identification of industry standards relating to these communications, reference is made to TIA/EIA/IS634-A, "MSC-BS Interface for Public Wireless Communication Systems."

In order to provide mobile service to the newly registered mobile device 201, the serving MSC 212 transmits a Mobile Application Part (MAP) based signal, such as a location update signal (GSM message), to a home location register (HLR) 216 via a signaling link such as a signaling transfer point (STP) 214. An STP is a node in the signaling system 7 (SS7) telephone network that routes messages between exchanges and between exchanges and databases that hold subscriber and routing information. An HLR is one such database in a cellular system that contains all the subscribers within the provider's home service area. The data in the HLR is requested and transferred via SS7 to a VLR 222 in the new area.

In the embodiment of FIG. 2A, the STP 214 can also route the MAP based signal to a gateway MSC 218. The SS7 network sets up and tears down the call, handles all the routing decisions and supports all modem telephony services, such as local number portability (LNP). LNP allows a telephone subscriber to port his/her phone number when that subscriber relocates to a different region of the country, even when the local area code may be different. The voice switches known as service switching points (SSPs) query service control point (SCP) 213 databases using STPs as packet switches.

Accessing databases using a separate signaling network enables the system to more efficiently obtain static information such as the services a customer has signed up for and dynamic information such as ever-changing traffic conditions in the network. In addition, a voice circuit is not tied up until a connection is actually made between both parties.

There is an international version of SS7 standardized by the ITU, and national versions determined by each country. For example, ANSI governs the US standard for SS7, and Telcordia (Bellcore) provides an extension of ANSI for its member companies.

The MAP based signal typically sent over SS7 informs the HLR 216 of the network address associated with the MSC 212 currently serving the mobile device 201 and also requests requisite subscriber information for providing mobile service to the roaming mobile device 201. The HLR 216 updates its database to store the network address representing the serving MSC 212 and also copies the requested subscriber information to the VLR 222 associated with the serving MSC 212. The network address representing the serving MSC 212 stored in the HLR 216 is later utilized by the mobile network to reroute any incoming call intended for the mobile device 201 to the serving MSC 212.

Accordingly, whenever a telecommunications subscriber dials a telephone number for the mobile device 201, the HLR 216 is queried by the mobile network to determine the current location of the mobile device 201. Utilizing the stored network address in HLR 216 representing the serving MSC 212, the HLR 216 requests a roaming number from the serving MSC 212 in response to the receipt of the query signal. The roaming number provided by the serving MSC 212 is then used by the telecommunications network to route the incoming signal towards the serving MSC 212. The serving MSC 212 then pages the mobile device 201 and accordingly establishes a voice connection with the mobile device 201, if available.

If the mobile device 201 roams out of serving MSC 212 coverage area and into another MSC 224 coverage area, MSC 212 will hand-off the communication to MSC 224 and base station 226. To ensure compatibility between two MSCs, the procedures and protocol for the format and transmission of messages have been standardized. For an identification of industry standards relating to these communications, reference is made to ANSI/IS-41, "Cellular Radio telecommunications Intersystem Operations."

In the example of mobile device call delivery, a visited network tracks the location of a roaming user and a visitor location register (VLR) reports that location information via a control network to the home location register (HLR) of the home network. Control networks may include ANSI/IS-41 and GSM MAP types of networks, among others. An authentication center (AC) in a home network can be used for user registration and authentication, e.g., checking to see, among other things, if the user has made payments. When a call, relayed from the public switched telephony network (PSTN) to the home mobile switching center (MSC) is to be delivered to a subscriber, the home MSC consults the HLR to determine the current whereabouts of the subscriber, e.g. the current serving/visited MSC, and the call is then directed via links and the PSTN to the visited MSC currently serving the device.

Embodiments of the invention provide an interoperability node 203 to act as a locator of a station on a number of networks. In the embodiment shown in FIGS. 2A and 2B, the requesting station 201 will, through the serving network 202, ask the interoperability node 203 to check to see if the target station 205 is located on the target network 204. As shown, the interoperability node 203 can be an independent unit as shown in FIG. 2A, or can be a part of one of the networks 202 or 204 or one of the stations 201 or 205. If located within a network such as 202 or 204, the interoperability node 203 can be independent or can be integrated with another element of the network such as the HLR, SCP, or STP. However, the location of the interoperability node is not so limited.

In FIG. 2B, an ANSI network 204 includes a target station 205 communicating with a mobile switching center (MSC) 232 through an ANSI air interface 237 with a base station 236 having an antenna 240.

As with the requesting station 201 of FIG. 2A, whenever a target station, e.g. 205, activates or roams into a new MSC coverage area (i.e., the "cell" for which the MSC is responsible), the new MSC 264 becomes the serving MSC. The station 205 transmits its stored identity to the new serving MSC 264 via a base station 266. As shown in FIG. 2B, the subscriber identity information is transmitted over a radio channel 208 in a format compliant with an air interface standard, e.g. ANSI/IS-41, and detected by an antenna 240 of base station 236.

Base station 236, in turn, transmits the subscriber identity information to the serving MSC 232, such as for example via a communication line. The procedures and protocol for communication between the base station 236 and the MSC 232 have also been standardized.

In order to provide mobile service to the newly registered mobile device 205, as the serving MSC 232, transmits a Mobile Application Part (MAP) based signal, such as a registration notification signal (IS-41 message) or location update signal (GSM message), to a home location register (HLR) 246 via a signaling link such as a signaling transfer point (STP) 244. The data in the HLR is requested and transferred via SS7 to a VLR 262 in the new area.

In the embodiment of FIG. 2B, the STP 244 routes the MAP based signal to a gateway MSC 248. The SS7 network sets up and tears down the call, handles all the routing decisions and supports all modem telephony services, such as local number portability (LNP). LNP allows a telephone subscriber to port his/her phone number when that subscriber relocates to a different region of the country, even when the local area code may be different. The voice switches known as service switching points (SSPs) query service control point (SCP) 243 databases using STPs as packet switches.

Figure 3:
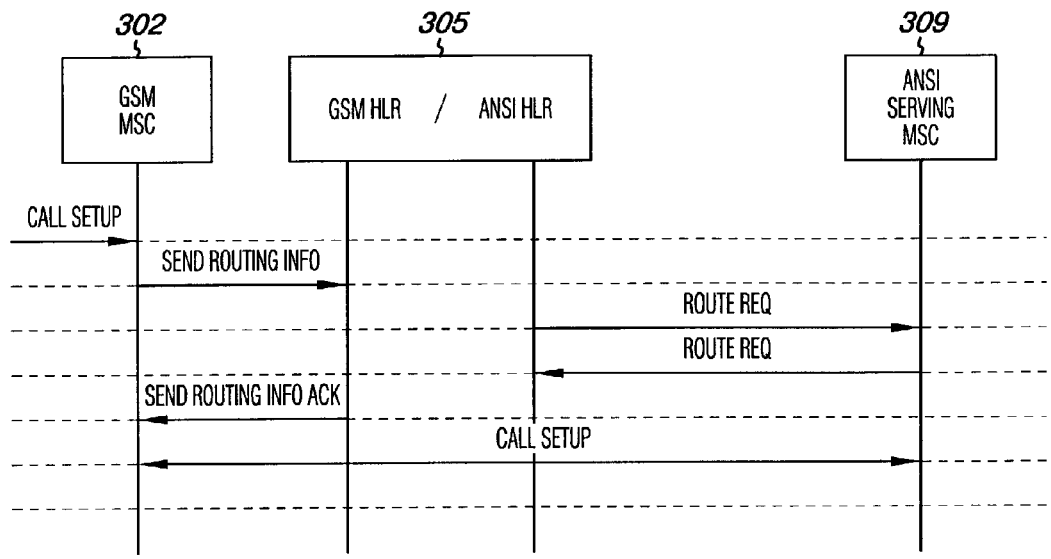
FIG. 3 is a scenario diagram illustrating an embodiment of the communication between a GSM network and an ANSI network for locating a station.

FIG. 3 illustrates an embodiment of the information exchange between network entities. In this figure a GSM network is communicating with an ANSI network through an interoperability node. In this embodiment, each horizontal arrow represents a communication within or between networks and the communication arrows are read from top to bottom.

A communication session setup request, e.g. call setup, is initiated by the requesting station (not shown) to the MSC 302 of the GSM network. A message containing routing information is sent to the GSM HLR that in this case is also acting as the interoperability node.

A query and invocation message can be sent from the GSM HLR to the ANSI HLR, in this case the two are combined in GSM HLR/ANSI HLR 305. Since the networks can communicate differently at this stage of their communication, the interoperability node can translate the message such that the ANSI HLR can understand the request. If a single HLR is acting as both the GSM HLR and the ANSI HLR, as it is in the example of FIG. 3, then this message is sent internally or may not need to be sent.

The ANSI HLR sends a route request to the ANSI serving MSC 309 to request the correct routing information for a target station. If a single HLR is acting for both the GSM and ANSI networks, the HLR will interpret the setup request and convey it to the ANSI network such that the ANSI network can understand it.

If the station is located on the network, the target station's routing information is sent back to the ANSI HLR. If the station is not located on the network, the network can respond that the target station is not located thereon, or alternatively, the target network can not respond to the route request and the request will time out.

The ANSI HLR conveys this information to the GSM HLR. The GSM HLR then translates the information such that the GSM network can understand it, if translation is necessary, and sends an acknowledgement message to the GSM MSC 302 indicating that the target routing information has been acquired from the target network. The networks can then be connected and the communications session can commence.

Figure 4:
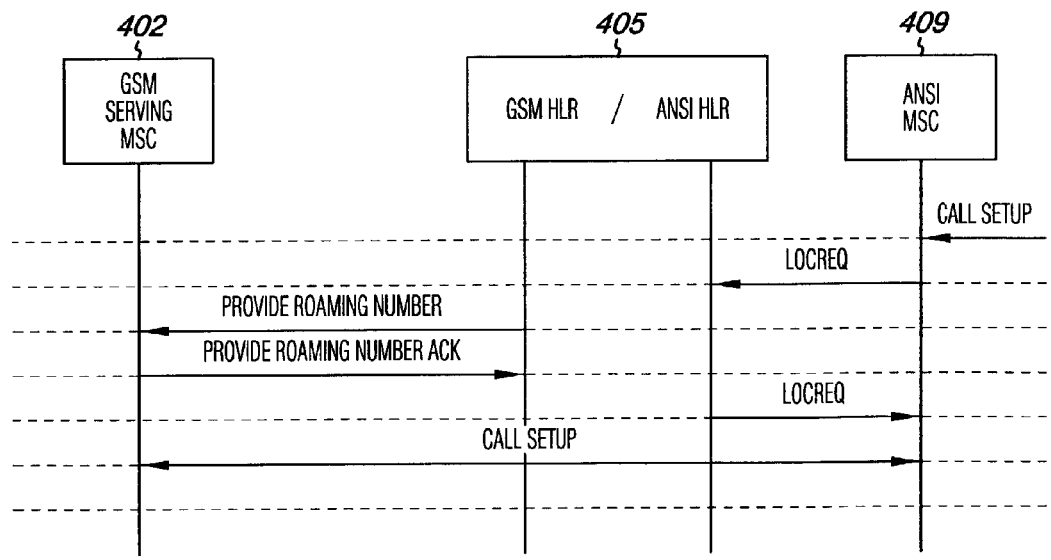
FIG. 4 is a scenario diagram illustrating another embodiment of the communication between an ANSI network and a GSM network for locating a station.

FIG. 4 illustrates an embodiment of the information exchange between network entities. In this figure an ANSI network is communicating with a GSM network through an interoperability node. As with FIG. 3, each horizontal dashed line represents a communication within or between networks and is read from top to bottom.

A communication session setup request, e.g. call setup, is initiated by the requesting station (not shown) to the MSC 409 of the ANSI network. A message containing location information is sent to the ANSI HLR that in this case is also acting as the interoperability node.

A query and invocation message can be sent from the ANSI HLR to the GSM HLR, in this case the two are combined in GSM HLR/ANSI HLR 405. Since the networks can communicate differently at this stage of their communication, the interoperability node can translate the message such that the GSM HLR can understand the request. If a single HLR is acting as both the ANSI HLR and the GSM HLR, as it is in the example of FIG. 4, then this message is sent internally or may not need to be sent.

The GSM HLR sends a roaming number request to the GSM serving MSC 402 to request the correct roaming number information for the target station. If a single HLR is acting for both the ANSI and GSM networks, the HLR will interpret the setup request and convey it to the GSM network such that the GSM network can understand it.

If the station is located on the network, the target station's roaming number information is sent back to the GSM HLR. If the station is not located on the network, the network can respond that the target station is not located thereon, or alternatively, the target network can not respond to the route request and the request will time out.

The GSM HLR conveys this information to the ANSI HLR. The ANSI HLR then translates the information such that the ANSI network can understand it, if translation is necessary, and sends an acknowledgement message to the ASNI MSC 409 indicating that the target roaming number information has been acquired from the target network. The networks can then be connected and the communications session can commence.

Figure 5:
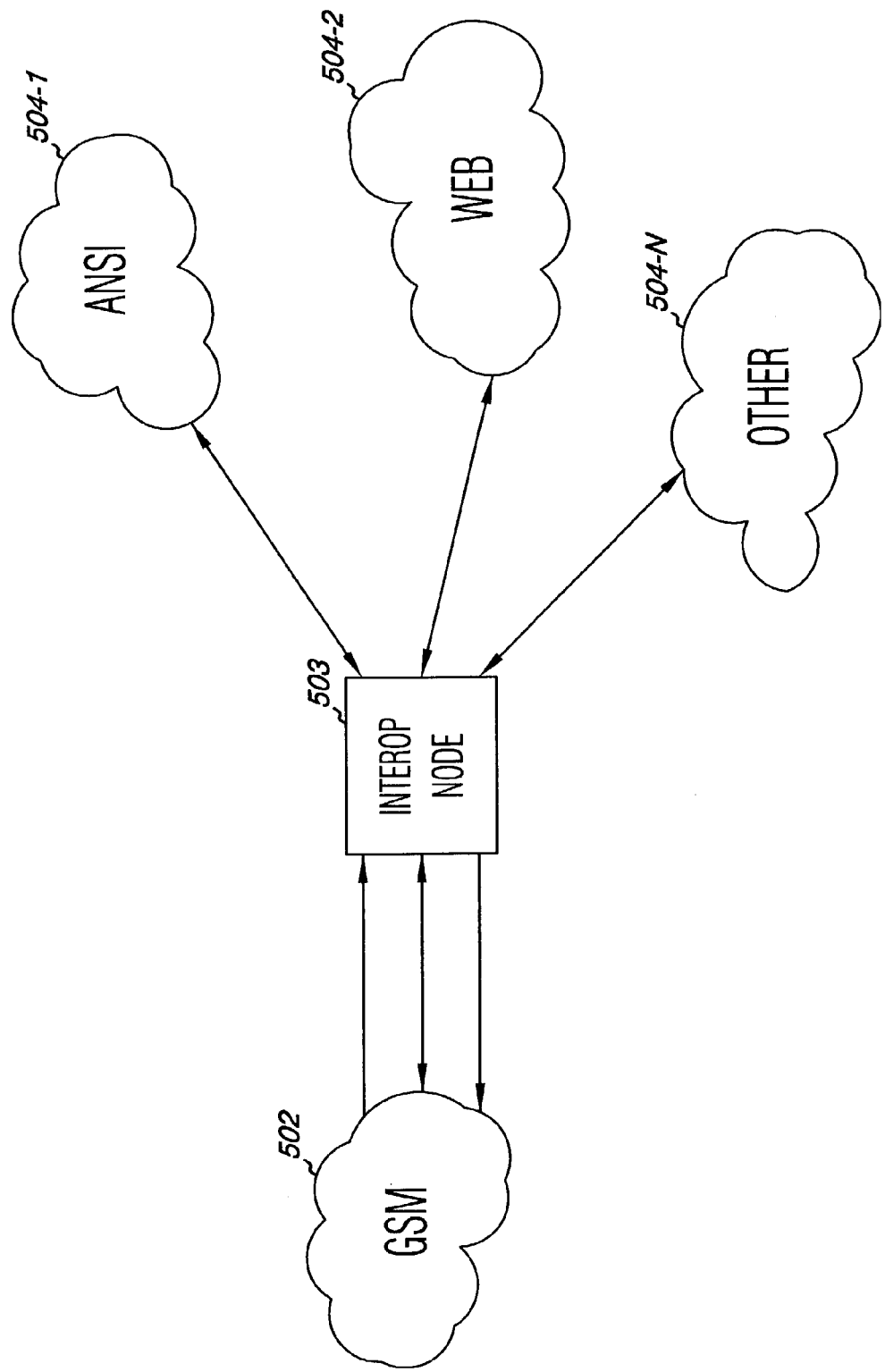
FIG. 5 is a block diagram of an embodiment which depicts the interoperability of a number of networks.

FIG. 5 illustrates the communication between several networks through an interoperability node. In the example shown, a first network (labeled GSM) 502 is attempting to locate a target station (not shown) on one of a number of other networks present (labeled ANSI, WEB, and OTHER), in this case networks 504-1 to 504-N by communicating through interoperability node 503. In this embodiment, the first network 502 queries the interoperability node 503 in an attempt to connect with a target station (not shown). The interoperability node 503 contacts the targeted networks 504-1 to 504-N to identify if the target station is located on one or more of the targeted networks.

Each contacted network returns location information regarding the targeted station, if any is found on the target network. This information can include one or more identifiers, such as telephone numbers, subscriber identification numbers, domain names, and IP addresses, among others. The location information can also include status information, for example, whether the station or network is busy, or whether the station is registered or unregistered, among others.

The interoperability node 503 can be operable to map all identifiers received from the different networks, i.e. 504-1 to 504-N, to each other to thereby provide a listing of possible network connections available for the target station.

The interoperability node 503 can provide all or some of the information, e.g. all networks that are not busy, to the serving network 502 or station in an appropriate format to successfully connect the requesting station to the target station. The communication session can be conducted through the interoperability node 503, where the node 503 translates information such that the networks can understand each other. Additionally, one or more of the requesting station, serving network, and/or interoperability node can be operable to determine a preferred connection based upon the available networks. Some criteria that can be utilized to evaluate the preferred connection can include speed of communication through a particular network, cost of transmission, and quality of transmission, among others.

The communication session can also be conducted directly between the stations. In this embodiment, a translation protocol can, for example, be sent from the interoperability node to one of the stations to allow the requesting station to communicate with the target station. However, the invention is not so limited.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the invention. It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the invention includes any other applications in which the above structures and methods are used. Therefore, the scope of various embodiments of the invention should be determined with reference to the appended claims, along with the full range of equivalents to which such claims are entitled.

It is emphasized that the Abstract is provided to comply with 37 C.F.R. § 1.72(b) requiring an Abstract that will allow the reader to quickly ascertain the nature of the technical disclosure. It is submitted with the understanding that it will not be used to limit the scope of the claims.

In the foregoing Detailed Description, various features are grouped together in a single embodiment for the purpose of streamlining the disclosure. This method of disclosure is not to be interpreted as reflecting an intention that the embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A wireless system, comprising:
   an interoperability node to:
     receive a communication session setup request from a service center of a first network to initiate a communication session between a requesting station and a target station;
     send a request to service centers of a plurality of target networks to determine whether the target station is located on the plurality of target networks;
     receive confirmations from the service centers of the plurality of target networks indicating that the target station is located on the plurality of target networks;
     create, from the received confirmations, a listing of available network connections to the target station;
     evaluate the available network connections for at least one of speed of communications, cost of transmission, or quality of transmission;

select one of the available network connections as a preferred transmission path between the requesting station and the target station based on the evaluation; and send the preferred transmission path to the service center of the first network.

2. The system of claim 1, wherein the interoperability node is to confirm a registration of the target station.

3. The system of claim 1, wherein the interoperability node is to identify network protocols of the plurality of target networks on which the target station is located.

4. The system of claim 1, wherein the interoperability node is to identify a status of the target station.

5. The system of claim 4, wherein the interoperability node is to return a status message of the target station to the service center of the first network.

6. The system of claim 1, wherein the interoperability node is to return a station location identifier of the target station to the service center of the first network.

7. A wireless architecture, comprising:
a global system for mobile communications (GSM) network including a service center to communicate with a requesting mobile device; and
an interoperability node to:
receive a communication session setup request from the service center of the GSM network to initiate a communication session between the requesting mobile device and a target device;
send a request to service centers of a plurality of target networks to determine whether the target device is located on the plurality of target networks;
receive confirmations from the service centers of the plurality of target networks indicating that the target device is located on the plurality of target networks;
create, from the received confirmations, a listing of available network connections to the target device;
evaluate the available network connections for at least one of speed of communications, cost of transmission, or quality of transmission;
select one of the available network connections as a preferred transmission path between the requesting mobile device and the target device based on the evaluation; and
send the preferred transmission path to the service center of the GSM network.

8. The wireless architecture of claim 7, wherein the interoperability node is located within a service control point (SCP) in an ANSI network.

9. The wireless architecture of claim 7, wherein the interoperability node is located within a signal transfer point (STP) in an ANSI network.

10. The wireless architecture of claim 7, wherein the interoperability node is located within a service control point (SCP) in the GSM network.

11. The wireless architecture of claim 7, wherein the interoperability node is located within a home location register (HLR) in the GSM network.

12. The wireless architecture of claim 7, wherein the interoperability node is to return a station location identifier of the target device to the service center of the GSM network.

13. A method for a wireless operation, comprising:
receiving, at an interoperability node, a communication session setup request from a service center of a first network to initiate a communication session between a requesting station and a target station;
sending a request, by the interoperability node, to service centers of a plurality of target networks to determine whether the target station is located on the plurality of target networks;
receiving, at the interoperability node, confirmations from the service centers of the plurality of target networks indicating that the target station is located on the plurality of target networks;
creating, by the interoperability node, a listing of available network connections to the target station based on the received confirmations;
evaluating the available network connections for speed of communications, cost of transmission, and quality of transmission;
selecting one of the available network connections as a preferred transmission path between the requesting station and the target station based on the evaluation; and
sending the preferred transmission path to the service center of the first network.

14. The method of claim 13, wherein the method further includes returning a station location identifier of the target station to the service center of the first network.

15. A non-transitory computer storage medium having instructions for causing a device to:
receive a communication session setup request from a service center of a first network to initiate a communication session between a requesting station and a target station;
send a request to service centers of a plurality of target networks to determine whether the target station is located on the plurality of target networks;
receive confirmations from the service centers of the plurality of target networks indicating that the target station is located on the plurality of target networks;
create, from the received confirmations, a listing of available network connections to the target station;
select, from the available network connections, a preferred transmission path between the requesting station and the target station; and
send the preferred transmission path to the service center of the first network.

16. The wireless system of claim 1, wherein the interoperability node is to send the request to one of the plurality of target networks at a time and wait to receive a confirmation from that target network before sending the request to a next one of the plurality of target networks.

17. The wireless system of claim 1, wherein the interoperability node is to send the request to all of the plurality of target networks simultaneously.

18. The non-transitory computer storage medium of claim 15, wherein the instructions for causing the device to send the request to the service centers of the plurality of target networks include instructions for causing the device to send the request to one of the plurality of target networks at a time and wait to receive a confirmation from that target network before sending the request to a next one of the plurality of target networks.

19. The non-transitory computer storage medium of claim 15, wherein the instructions for causing the device to send the request to the service centers of the plurality of target networks include instructions for causing the device to send the request to all of the plurality of target networks simultaneously.

* * * * *